United States Patent
Kim et al.

(10) Patent No.: US 12,272,158 B2
(45) Date of Patent: Apr. 8, 2025

(54) METHOD AND APPARATUS WITH LANE GENERATION

(71) Applicant: SAMSUNG ELECTRONICS CO., LTD., Suwon-si (KR)

(72) Inventors: Nayeon Kim, Suwon-si (KR); Moonsub Byeon, Seoul (KR); Dokwan Oh, Hwaseong-si (KR); Dae Hyun Ji, Hwaseong-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 288 days.

(21) Appl. No.: 17/862,821

(22) Filed: Jul. 12, 2022

(65) Prior Publication Data

US 2023/0154206 A1 May 18, 2023

(30) Foreign Application Priority Data

Nov. 5, 2021 (KR) .................. 10-2021-0151184
Jan. 5, 2022 (KR) .................. 10-2022-0001807

(51) Int. Cl.
*G06V 20/56* (2022.01)
*B60W 40/06* (2012.01)

(52) U.S. Cl.
CPC .......... *G06V 20/588* (2022.01); *B60W 40/06* (2013.01); *B60W 2552/53* (2020.02)

(58) Field of Classification Search
None
See application file for complete search history.

(56) References Cited

U.S. PATENT DOCUMENTS

| | | | |
|---|---|---|---|
| 10,846,541 B2 | 11/2020 | Joshi et al. | |
| 10,956,756 B2 | 5/2021 | Stein et al. | |
| 11,100,344 B2 | 8/2021 | Levi et al. | |
| 2021/0157330 A1 | 5/2021 | Tran | |

(Continued)

FOREIGN PATENT DOCUMENTS

| | | |
|---|---|---|
| JP | 2018-88151 A | 6/2018 |
| JP | 6565967 B2 | 8/2019 |
| KR | 10-2094341 B1 | 3/2020 |

(Continued)

OTHER PUBLICATIONS

Gen-LaneNet: A Generalized and Scalable Approach for 3D Lane Detection. Guo et al. (Year: 2020).*

(Continued)

*Primary Examiner* — Delomia L Gilliard
(74) *Attorney, Agent, or Firm* — NSIP Law

(57) ABSTRACT

A method of generating lane information using a neural network includes generating a lane probability map based on an input image, generating lane feature information and depth feature information by applying the lane probability map to a second neural network, generating depth distribution information by applying the depth feature information to a third neural network, generating spatial information based on the lane feature information and the depth distribution information, generating offset information including a displacement between a position of a lane and a reference line by applying the spatial information to a fourth neural network, and generating three-dimensional (3D) lane information using the offset information.

22 Claims, 8 Drawing Sheets

(56) References Cited

U.S. PATENT DOCUMENTS

2021/0241005 A1 8/2021 Abbott et al.

FOREIGN PATENT DOCUMENTS

| KR | 10-2020-0060194 A | 5/2020 |
| KR | 10-2021-0066025 A | 6/2021 |
| KR | 10-2021-0093351 A | 7/2021 |

OTHER PUBLICATIONS

Catergorical Depth Distribution Network for Mononcular 3D Object Detection. Reading et al. (Year: 2021).*

Garnett, Noa, et al. "3d-lanenet: end-to-end 3d multiple lane detection." *Proceedings of the IEEE/CVF International Conference on Computer Vision.* (2019). pp 2921-2930.

Efrat, Netalee, et al. "3d-lanenet+: Anchor free lane detection using a semi-local representation." *arXiv preprint arXiv:2011.01535* vol. 2 (2020). pp 1-10.

Guo, Yullang, et al. "Gen-lanenet: A generalized and scalable approach for 3d lane detection." *European Conference on Computer Vision.* Springer, Cham, vol. 1 (2020). pp. 1-14.

Lang, Alex H., et al. "Pointpillars: Fast Encoders for Object Detection from Point Clouds." Proceedings of the IEEE/CVF conference on computer vision and pattern recognition. 2019, (9 pages in English).

Reading, Cody, et al. "Categorical Depth Distribution Network for Monocular 3D Object Detection." Proceedings of the IEEE/CVF Conference on Computer Vision and Pattern Recognition., arXiv:2103.01100v2 [cs.CV] Mar. 23, 2021, (11 pages in English).

Extended European search report issued on Feb. 10, 2023, in counterpart European Patent Application No. 22205534.5 (11 pages in English).

* cited by examiner

METHOD AND APPARATUS WITH LANE GENERATION

CROSS-REFERENCE TO RELATED APPLICATIONS

This application claims the benefit under 35 USC § 119(a) of Korean Patent Application No. 10-2021-0151184 filed on Nov. 5, 2021, and Korean Patent Application No. 10-2022-0001807 filed on Jan. 5, 2022, in the Korean Intellectual Property Office, the entire disclosures of which are incorporated herein by reference for all purposes.

BACKGROUND

1. Field

The following description relates to a method and apparatus for generating lane information.

2. Description of Related Art

Deep learning-based image processing technology has advanced and is being applied to autonomous driving. The deep learning-based autonomous driving technology has increased the potential for deep learning-based lane recognition technology. Lane recognition technology may be fundamental to autonomous driving. For high performance in lane recognition based on deep learning even in more diversified road environments, understanding the topographical features of roads may be needed. Thus, research and investments in a technology for identifying topographical features of a road are gradually increasing.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a neural network-based method of generating lane information, including generating a lane probability map based on an input image, generating lane feature information and depth feature information by applying the lane probability map to a second neural network, generating depth distribution information by applying the depth feature information to a third neural network, generating spatial information based on the lane feature information and the depth distribution information, generating offset information including a displacement between a position of a lane and a reference line by applying the spatial information to a fourth neural network, and generating three-dimensional (3D) lane information using the offset information.

The generating of the lane probability map may include generating the lane probability map using a first neural network trained to generate lane probability values respectively corresponding to pixels in the input image, wherein each of the lane probability values comprise a probability of a pixel of the pixels being in the lane.

The second neural network may be trained to generate the lane feature information using a first channel associated with lane features, or to generate the depth feature information using a second channel associated with depth features.

The depth feature information may include at least one of a height of the lane including a length in a vertical direction with respect to the reference line or a distance between an imaging device and the lane.

The depth distribution information may include depth probability distributions respectively corresponding to pixels in the input image.

The generating of the spatial information may include generating frustum-based first spatial information through an outer product of the lane feature information and the depth distribution information.

The generating of the spatial information may include generating frustum-based first spatial information based on the lane feature information and the depth distribution information, transforming the first spatial information into voxel map-based second spatial information, transforming the second spatial information into third spatial information based on channel dimension information, and determining the third spatial information to be the spatial information.

The first spatial information may include spatial information in a 3D coordinate system based on a viewpoint of the input image.

The second spatial information may include spatial information in a 3D coordinate system based on a viewpoint of a vehicle.

The transforming into the second spatial information may include transforming the first spatial information into the second spatial information based on calibration parameters, wherein the calibration parameters comprise any one or any combination of intrinsic parameters of an imaging device for capturing the input image and extrinsic parameters of the imaging device.

The intrinsic parameters may include one or any combination of focal length, a principal point, an aspect ratio, a center point, and an asymmetry parameter of the imaging device and the extrinsic parameters comprise an installation height of the imaging device, a pan of the imaging device, and a tilt of the imaging device.

The offset information may include at least one of a first offset in a direction horizontal to a travel direction of a vehicle or a second offset in a direction vertical to the reference line.

The method may include generating at least one of a probability value of the reference line being the lane, visibility information, a first uncertainty corresponding to a first offset, and a second uncertainty corresponding to a second offset, by applying the spatial information to the fourth neural network.

The neural network may be trained using a loss function defined based on any one or any combination of a first uncertainty and a second uncertainty.

The neural network may be trained using a loss function defined based on any one or any combination of a first uncertainty associated with an offset in a horizontal direction and a second uncertainty associated with an offset in a vertical direction.

The neural network may include a neural network trained using a loss function defined based on a probability value of the reference line being the lane.

The neural network may include a neural network trained using a loss function defined based on visibility information.

The first neural network may include a neural network trained using images labelled with lanes as ground truth data.

In another general aspect, there is provided a device including a processor configured to generate a lane probability map based on an input image, generate lane feature information and depth feature information by applying the lane probability map to a second neural network, generate depth distribution information by applying the depth feature information to a third neural network, generate spatial information based on the lane feature information and the depth distribution information, generate offset information including a displacement between a position of a lane and a reference line by applying the spatial information to a fourth neural network, and generate three-dimensional (3D) lane information using the offset information.

In another general aspect, there is provided a vehicle including a sensor configured to capture an input image, non-transitory computer-readable storage medium configured to store instructions, a first neural network, a second neural network, a second neural network, and a second neural network, and a processor configured to execute the instructions to generate a lane probability map based on the first neural network trained to generate lane probability values respectively corresponding to pixels in the input image, generate lane feature information and depth feature information by applying the lane probability map to the second neural network, generate depth distribution information by applying the depth feature information to the third neural network, generate spatial information based on the lane feature information and the depth distribution information, and generate offset information including a displacement between a position of a lane and a reference line by applying the spatial information to the fourth neural network, generate three-dimensional (3D) lane information using the offset information, and output the 3D lane information to a vehicle control unit (VCU) of the vehicle.

The second neural network may include a first sub-neural network trained to generate the lane feature information, and a second sub-neural network trained to generate the depth features, and the first sub-neural network and the second sub-neural network share one or more layers.

Other features and aspects will be apparent from the following detailed description, the drawings, and the claims.

Figure 1:
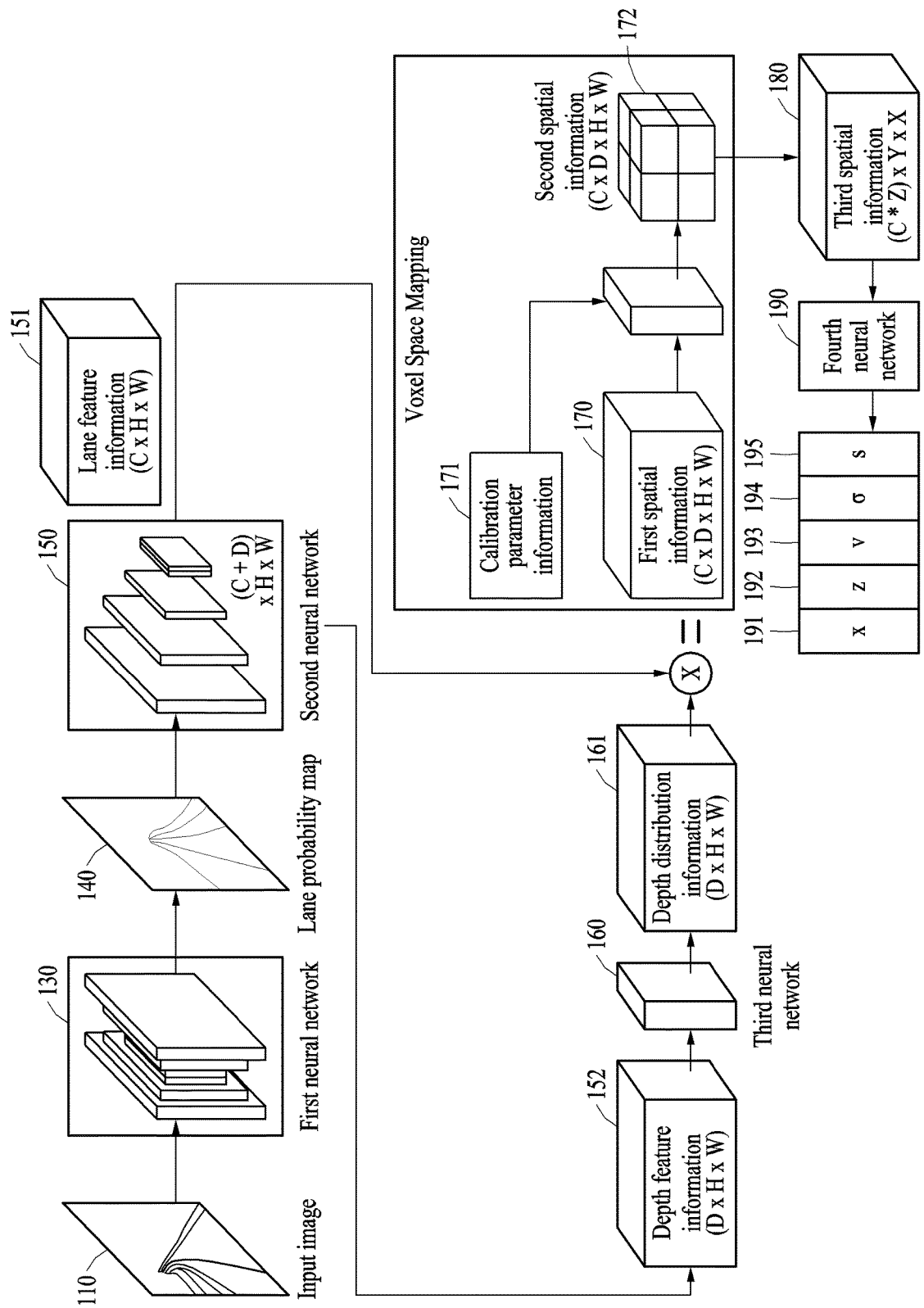
FIG. 1 illustrates an example of a neural network for generating lane information.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

The use of the term "may" herein with respect to an example or embodiment (e.g., as to what an example or embodiment may include or implement) means that at least one example or embodiment exists where such a feature is included or implemented, while all examples are not limited thereto.

Also, in the description of example embodiments, detailed description of structures or functions that are thereby known after an understanding of the disclosure of the present application will be omitted when it is deemed that such description will cause ambiguous interpretation of the example embodiments.

According to an example embodiment, a processor may store instructions or data in a memory, execute the instructions and/or process data stored in the memory, and store resulting data obtained therefrom in the memory. In an example, the processor may be a data processing device implemented by hardware including a circuit having a physical structure to perform desired operations. For example, the desired operations may include code or instructions included in a program. In an example, the processor may include a main processor (e.g., a central processing unit (CPU) or an application processor) or an auxiliary processor (e.g., a graphics processing unit (GPU), a neural processing unit (NPU), an image signal processor, a sensor hub processor, or a communication processor) operable independently of or along with the main processor. For example, when the electronic device includes both the main processor and the auxiliary processor, the auxiliary processor may use lower power than the main processor or may be set to be specific to an assigned function. The auxiliary processor may be implemented separately from or as a portion of the main processor.

Hereinafter, examples will be described in detail with reference to the accompanying drawings, and like reference numerals in the drawings refer to like elements throughout.

FIG. 1 illustrates an example of a neural network for generating lane information.

Referring to FIG. 1, illustrated are an input image 110, a first neural network 130, a lane probability map 140, a second neural network 150, lane feature information 151, depth feature information 152, a third neural network 160, depth distribution information 161, first spatial information 170, calibration parameter information 171, second spatial information 172, third spatial information 180, a fourth neural network 190, and output data 191, 192, 193, 194, and 195 of the fourth neural network 190.

Figure 7:
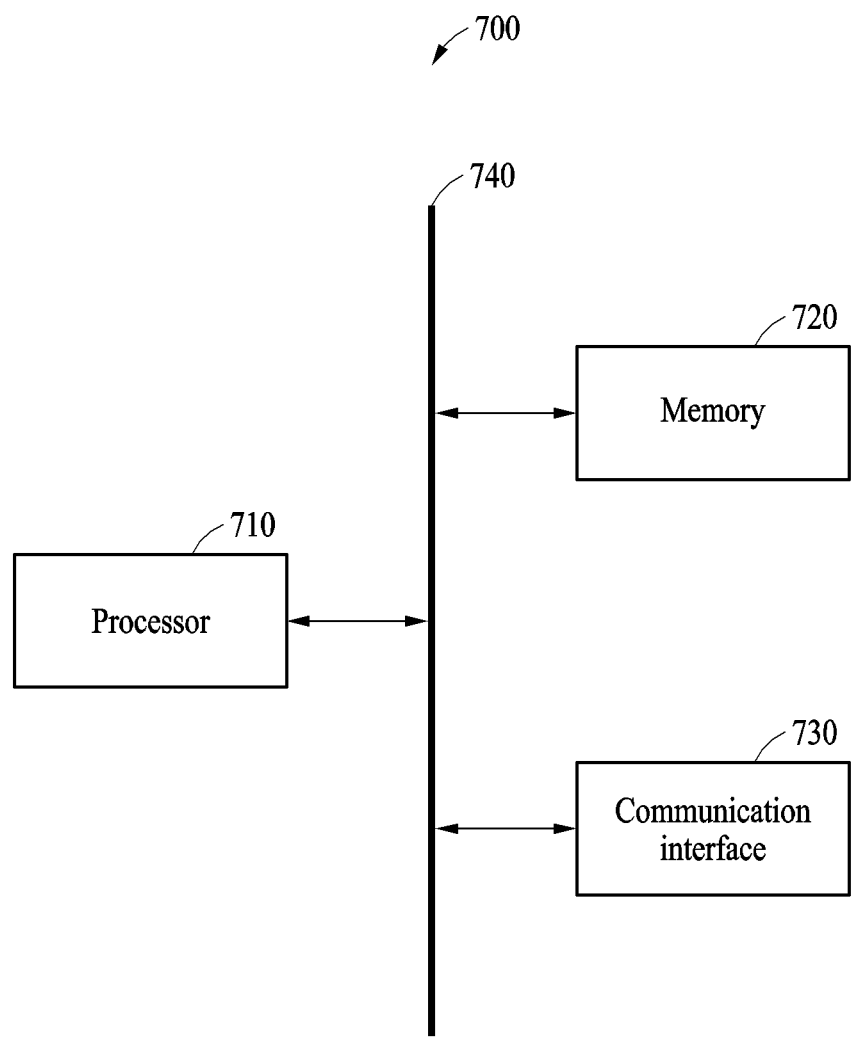
FIG. 7 illustrates an example of an electronic device.

In an example, a processor, such as, processor 710 of FIG. 7, may generate lane information using a neural network. The neural network may include a neural network for generating lane information. The neural network may include at least one of the first neural network 130, the second neural network 150, the third neural network 160, and the fourth neural network 190. In an example, the neural network may omit some neural network (or layer) or further include another neural network (or layer).

In an example, the processor 710 may generate the lane probability map 140 based on the input image 110. The processor 710 may generate the lane probability map 140 using the first neural network 130 trained to generate lane probability values corresponding to a plurality of pixels included in the input image 110. The input image 110 may include an image to be input to the neural network. For example, the input image 110 may include an image that is captured when a vehicle travels on a road. In an example, the input image 110 may include a plurality of (traffic) lanes. The lane probability map 140 may include the lane probability values respectively corresponding to the pixels in the input image 110. For example, the processor 170 may generate a probability value of a pixel being a lane per pixel using the first neural network 130. For example, a probability of pixel 1 being a lane may be 98%. In this example, pixel 1 may be highly likely to be the lane. For another example, a probability of pixel 2 being a lane may be 8%. In this example, pixel 2 may be less likely to be the lane. In an example, the first neural network 130 may include a neural network trained to perform image segmentation. The image segmentation may include pixelwise object recognition. The first neural network 130 may include a neural network trained to generate the lane probability map 140. The processor 710 may train the first neural network 130 using ground truth data labeled with lanes. For example, training data used for training the first neural network 130 may use an image including lanes as an input image and an image labeled with lanes as ground truth data. In this case, the processor 710 may train only the first neural network 130 separately, and the parameters of the second neural network 150, the third neural network 160, and/or the fourth neural network 190 may not be updated.

In an example, the processor 710 may generate the lane feature information 151 and the depth feature information 152 by applying the lane probability map 140 to the second neural network 150. In the example of FIG. 1, C+D corresponds to the number of channels, H denotes a vertical length (e.g., the number of pixels in a vertical direction) of an image, and W denotes a horizontal length (e.g., the number of pixels in a horizontal direction) of the image. In an example, the second neural network 150 may include a neural network trained to generate the lane feature information 151 and the depth feature information 152. In an example, the second neural network 150 may include a 2-1 sub-neural network and a 2-2 sub-neural network. In this example, the 2-1 sub-neural network may include a neural network trained to generate the lane feature information 151, and the 2-2 sub-neural network may include a neural network trained to generate the depth feature information 152. The 2-1 sub-neural network and the 2-2 sub-neural network may share at least a portion of layers. In another example, the second neural network 150 may be trained to generate the lane feature information 151 using a first channel associated with lane features. The first channel may include at least one channel associated with lane features. For example, the number of channels included in the first channel may be indicated as C in FIG. 1. The second neural network 150 may be trained to generate the depth feature information 152 using a second channel associated with depth features. The second channel may include at least one channel associated with depth features. For example, the number of channels included in the second channel may be indicated as D in FIG. 1. In an example, the second neural network 150 may include a convolution layer, a batch normalization layer, a rectified linear unit (ReLU), a pooling layer, and/or a 1×1 convolution layer.

The lane feature information 151 may include information associated with features of lanes distinguished from other objects in an image. For example, the lane feature information 151 may include information associated with features of lanes distinguished from road structures, vehicle objects, or background in the image. Inn an example the lane feature information 151 may be represented in the form of a vector. The processor 710 may generate the lane feature information 151 using the first channel in the second neural network 150. For example, when the number of channels of the first channel is C, the size of the lane feature information 151 may be C×H×W. The processor 710 may also generate the lane feature information 151 using the 2-1 sub-neural network.

In an example, the depth feature information 152 may include information associated with features of a depth of a pixel in a two-dimensional (2D) image to form a three-dimensional (3D) space from the 2D image. For example, a depth of a pixel may be represented as a depth value in (x, y) coordinates. In this example, the depth feature information 152 may be depth information of the pixel represented in the form of a vector. The processor 710 may generate the depth feature information 152 using the second channel in the second neural network 150. For example, when the number of channels of the second channel is D, the size of the depth feature information 152 may be D×H×W. In another example, the processor 710 may generate the depth feature information 152 using the 2-2 sub-neural network.

In an example, the depth feature information 152 may include at least one of a lane height (e.g., a lane height 230 in FIG. 2) which is a length in a vertical direction with respect to a reference line, and a distance (e.g., an imaging device-lane distance 250 in FIG. 2) between an imaging device and a lane.

Figure 2:
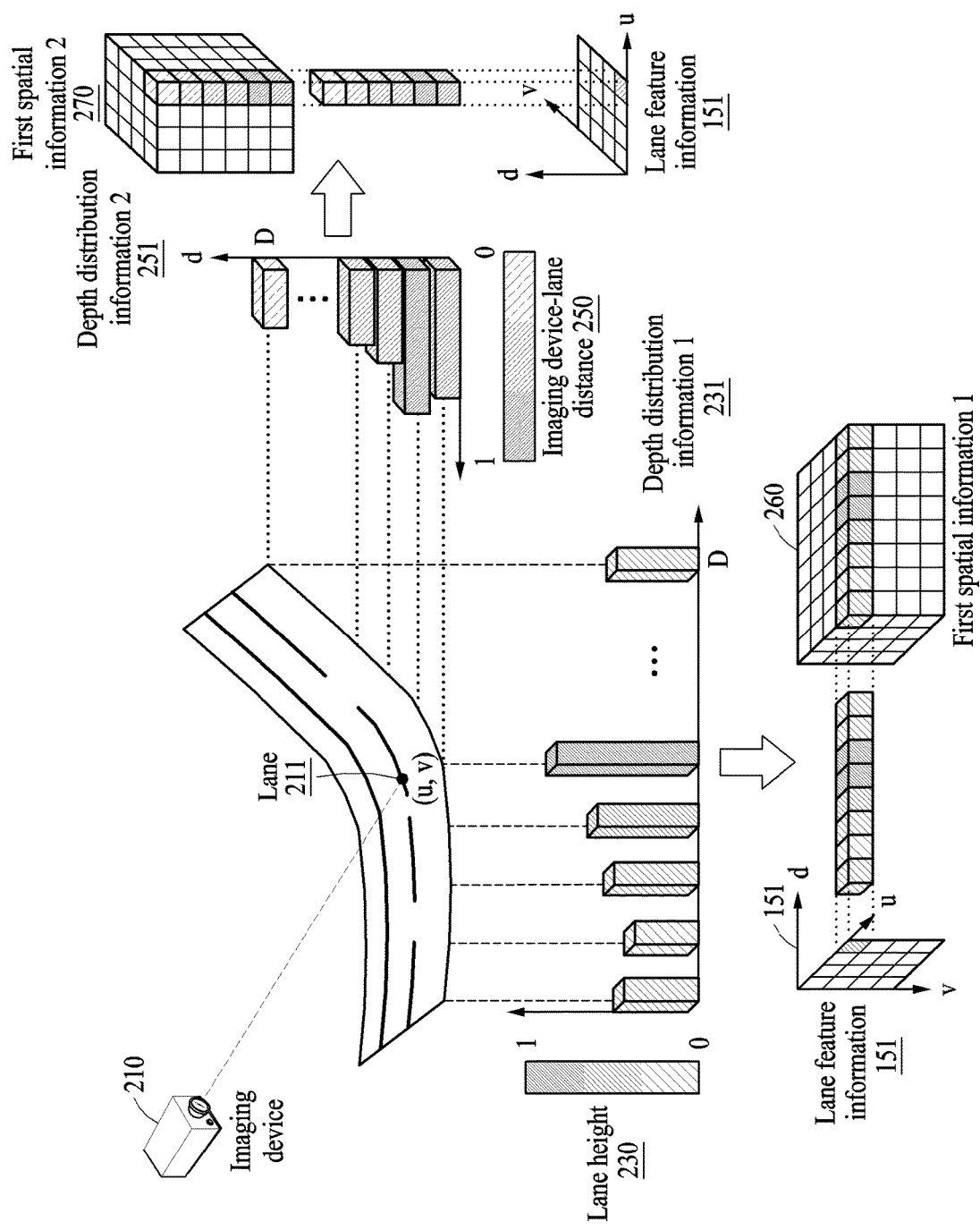
FIG. 2 illustrates an example of spatial information.

In an example, the lane height 230 may refer to a height of a lane determined based on a reference plane including a reference line in a 3D space. For example, when an xy plane is the reference plane as illustrated in FIG. 2, a z value of the lane may be a height of the lane. In an actual road environment, a road may have highs and lows. For example, the road may be an uphill road or a downhill road. Thus, accurately predicting a height of a road in a 3D space may be desirable to identify a situation on the road.

The imaging device-lane distance 250 may include a Euclidean distance between an imaging device and a lane as illustrated in FIG. 2. The imaging device-lane distance 250 may be calculated using each coordinate.

In an example, the processor 710 may generate the depth distribution information 161 by applying the depth feature information 152 to the third neural network 160.

In an example, the third neural network 160 may include a neural network trained to generate the depth distribution information 161. The third neural network 160 may include a neural network trained to generate the depth distribution information 161 per pixel. The third neural network 160 may include a normalization layer (e.g., a softmax layer). Through this, the processor 710 may use the third neural network 160 to represent a probability value corresponding to a depth value of a pixel as a value between 0 and 1. The third neural network 160 may include a 1×1 convolution layer. Thus, the size of input data of the third neural network 160 and the size of output data of the third neural network 160 may be the same. Accordingly, the size of the depth distribution information 161 may be the same as the size (e.g., D×H×W) of the depth feature information 152 which is the input data.

In an example, the depth distribution information 161 may include depth probability distributions respectively corresponding to the pixels included in the input image 110. The depth distribution information 161 may include a probability distribution of a depth corresponding to a pixel. A depth probability distribution may include a probability distribution indicating a probability of a pixel having a specific depth. For example, the depth probability distribution may include a continuous probability distribution and/or a discrete probability distribution. In this example, when the depth probability distribution is discrete, the depth distribution information 161 may be divided into a plurality of depth intervals and include a probability value corresponding to each of the depth intervals. For example, it may include a distribution including 10% probability of one pixel having a depth between 0 and 1, 20% probability of the pixel having a depth between 1 and 2, 40% probability of the pixel having a depth between 2 and 3, 20% probability of the pixel having a depth between 3 and 4, and 10% probability of the pixel having a depth between 4 and 5.

In an example, the processor 710 may generate spatial information based on the lane feature information 151 and the depth distribution information 161. The spatial information may include information for representing a 2D input image as a 3D space. The spatial information may include, for example, a 3D coordinate system, coordinates in the 3D coordinate system, a reference point, a reference line, and the like.

In an example, the processor 710 may generate the first spatial information 170 that is based on a frustum, based on the lane feature information 151 and the depth distribution information 161. The processor 710 may generate the first spatial information 170 that is based on the frustum through an outer product of the lane feature information 151 and the depth distribution information 161.

The frustum may be defined using parameters including a view angle, a near plane, a far plane, and the like. In an example, a value of each of the parameters may be preset. The view angle may refer to an angle of view of a virtual camera. The near plane and the far plane may each be an xy plane present at a preset position from a viewpoint of the virtual camera with respect to a first axis (e.g., a z axis in an xyz coordinate system). The processor 710 may determine a space including objects to be rendered through the near plane and the far plane. The z axis may refer to a direction of the viewpoint of the virtual camera, i.e., a direction the virtual camera views. The objects included in the space between the near plane and the far plane may be rendered, and objects that are not included in the space may be removed.

In an example, the first spatial information 170 may include spatial information in a coordinate system based on a viewpoint of the input image 110. For example, the input image 110 may be an image captured from a specific viewpoint. In an example, a viewpoint may change for the same object (e.g., a lane, a vehicle, etc.) as a position of an imaging device changes with reference to a position of the object. For example, the viewpoint may change for the same object (e.g., a lane, a vehicle, etc.) when the position of the imaging device is above or below the object. The first spatial information 170 may include frustum-based spatial information generated through the outer product of the lane feature information 151 and the depth distribution information 161. Thus, plane coordinates included in the input image 110 may be represented as coordinates in a space defined as the frustum through the outer product of the lane feature information 151 and the depth distribution information 161. For example, the first spatial information 170 may include the coordinates in the space defined as the frustum. For example, when the number of channels included in the first channel is C and the number of channels included in the second channel is D, a C×D matrix may be generated through the outer product. For example, when a horizontal length (e.g., the number of pixels in a horizontal direction) of an image is W and a vertical length (e.g., the number of pixels in a vertical direction) of the image is H, the size of the first spatial information 170 may be C×D×W×H.

The outer product may represent a tensor product of a vector. For example, through an outer product of two vectors represented as a column vector, a matrix may be generated. For example, through an outer product of a column vector with the size of C and a column vector with the size of D, a matrix with the size of C×D may be generated.

In an example, the processor 710 may transform the first spatial information 170 into the second spatial information 172 that is based on a voxel map. The voxel map may include a plurality of voxels. A voxel may be an implementation of a 2D pixel in a 3D form. The term "voxel" is a compound word of volume and pixel, and represents a pixel having a volume.

In an example, the second spatial information 172 may include spatial information in a 3D coordinate system based on a viewpoint of a vehicle. The second spatial information 172 may include voxel map-based spatial information based on the viewpoint of the vehicle. For example, a traveling direction of the vehicle may be determined to be one axis in the 3D coordinate system based on the viewpoint of the vehicle. The traveling direction of the vehicle, or a vehicle traveling direction, used herein may refer to a direction in which a vehicle travels.

A spatial coordinate system of the first spatial information 170 and a spatial coordinate system of the second spatial information 172 may be different from each other. A viewpoint of the first spatial information 170 and a viewpoint of the second spatial information 172 may be different from each other, the spatial coordinate systems thereof may be different. For example, a position of the imaging device capturing the input image 110 may be an origin point of the spatial coordinate system in the first spatial information 170. However, an origin point of the spatial coordinate system in the second spatial information 172 may not be the position of the imaging device in the first spatial information 170. For example, the origin point may be a rear tire axis of the vehicle or a front side of the vehicle. For another example, the first spatial information 170 and the second spatial information 172 may have the different spatial coordinate systems, and may thus have different grounds (e.g., an xy plane). Thus, transforming the viewpoint of the first spatial information 170 into the viewpoint of the second spatial information 172 may be desirable. Thus, the processor 710 may transform the first spatial information 170 into the second spatial information 172 based on the calibration parameter information 171. Through this, the processor 710 may generate 3D lane information by generating spatial coordinate systems at different angles.

In an example, calibration may be used to transform one coordinate system into another coordinate system. The calibration parameter information 171 may include calibration parameters used for the calibration and may be represented in the form of a matrix. The calibration parameters may include an intrinsic parameter of an imaging device and/or an extrinsic parameter of the imaging device. The intrinsic parameter may include a focal length, a principal point, an asymmetry parameter, and the like. The extrinsic parameter may include a rotation parameter and/or translation parameter between the two coordinate systems. The extrinsic parameter may be a parameter associated with a geometrical relationship between a camera and an external space, for example, a camera installation height and direction (e.g., pan and tilt) and the like. The intrinsic parameter may be a parameter intrinsic to a camera, for example, a focal length, an aspect ratio, a center point, and the like.

In an example, the processor 710 may transform the first spatial information 170 into the second spatial information 172 that is based on the voxel map. For example, coordinates included in the first spatial information 170 may be represented as pf=(u, v, d)T, and may be sampled. In addition, coordinates included in the second spatial information 172 may be sampled coordinates, and be represented as pv=(x, y, z)T. The sampled pv may be a center point of each voxel. The processor 710 may transform the sampled pv into the sampled pf in the first spatial information 170 using the calibration parameters. The processor 710 may obtain a value d corresponding to a z axis from the sampled pf through a function f. For example, the value d may be f(pv), or d=f(pv). In this example, d denotes a depth, and the function f may be f=(r31, r32, r33, t3)·(x, y, z, 1). In this example, r31, r32, and r33 may be elements corresponding to a third row in a rotation parameter $$\begin{pmatrix} r_{11} & r_{12} & r_{13} \\ r_{21} & r_{22} & r_{23} \\ r_{31} & r_{32} & r_{33} \end{pmatrix},$$

and t3 may be an element corresponding to a third row in a translation parameter $$\begin{pmatrix} t_1 \\ t_2 \\ t_3 \end{pmatrix}.$$

The processor 710 may transform d into di corresponding to a depth interval. The coordinates (pv=(x, y, z)T) included in the second spatial information 172 may be determined based on $\tilde{p}_f$=(u, v, di)T that is determined using a value of di, using trilinear interpolation. Through this, the processor 710 may transform the first spatial information 170 into the second spatial information 172.

The size of the second spatial information 172 may be determined to be C×Z×Y×X based on the size X in an x-axis direction, the size Y in a y-axis direction, the size Z in a z-axis direction, and on the number C of channels. The size of the second spatial information 172 may be the same as or different from the size of the first spatial information 170. The second spatial information 172 may include coordinates determined through interpolation after the sampling of the coordinates included in the first spatial information 170, and thus the size of the spatial information may change. In the example of FIG. 1, C denotes the number of channels. The number of channels may be determined based on at least one of the first channel and the second channel.

In an example, the processor 710 may transform the second spatial information 172 into the third spatial information 180 based on channel dimension information. The third spatial information 180 may include spatial information obtained as a voxel size of the voxel map is transformed in a vertical direction (e.g., a z axis in FIG. 2) in the second spatial information 172 based on the channel dimension information. The processor 710 may transform voxels included in the second spatial information 172 by performing channel concatenation on the channel dimension information in the vertical direction. Thus, the processor 710 may obtain the third spatial information 180 that includes a more accurate lane height. C in the second spatial information 172 and the third spatial information 180 may denote the number of channels. The number of channels may be determined based on at least one of the first channel and the second channel. For example, the channel dimension information may include the number of channels included in the first channel. For another example, the channel dimension information may include the number of channels included in the first channel and the second channel. For still another example, the channel dimension information may include the number of channels included in the second channel. In an example, * in (C*Z) may indicate an operator representing concatenate (or concatenation).

In an example, the processor 710 may generate offset information including a displacement difference between a lane position and a reference line by applying the spatial information to the fourth neural network 190. The processor 710 may generate the offset information by applying the third spatial information 180 to the fourth neural network 190. The fourth neural network 190 may include a neural network trained to generate information needed for generating 3D lane information. The fourth neural network 190 may include a neural network trained to generate at least one among the offset information, a probability value of the reference line being the lane, visibility information, and an uncertainty.

The offset information may include information as to how far the lane is from the reference line. The offset information may include the displacement difference between the lane position and the reference line. The offset information may include at least one of a first offset in a direction horizontal to the reference line that is a vehicle traveling direction, and a second offset in a direction vertical to the reference line. The reference line in a 3D space may be the vehicle traveling direction. For example, when a y axis (or a longitudinal axis) is the vehicle traveling direction in the 3D space, the reference line may be parallel to the y axis. When the reference line is parallel to the y axis in the 3D space, the direction horizontal to the vehicle traveling direction may be an x axis (or a lateral axis) and the direction vertical to the vehicle traveling direction may be a z axis (or a vertical axis). Thus, the first offset may include a displacement difference in the x-axis (or lateral axis) direction. The first offset is indicated as x 191 in FIG. 1. In addition, the second offset may include a displacement difference in the z-axis (or vertical axis) direction. The second offset is indicated as z 192 in FIG. 1.

Figure 3:
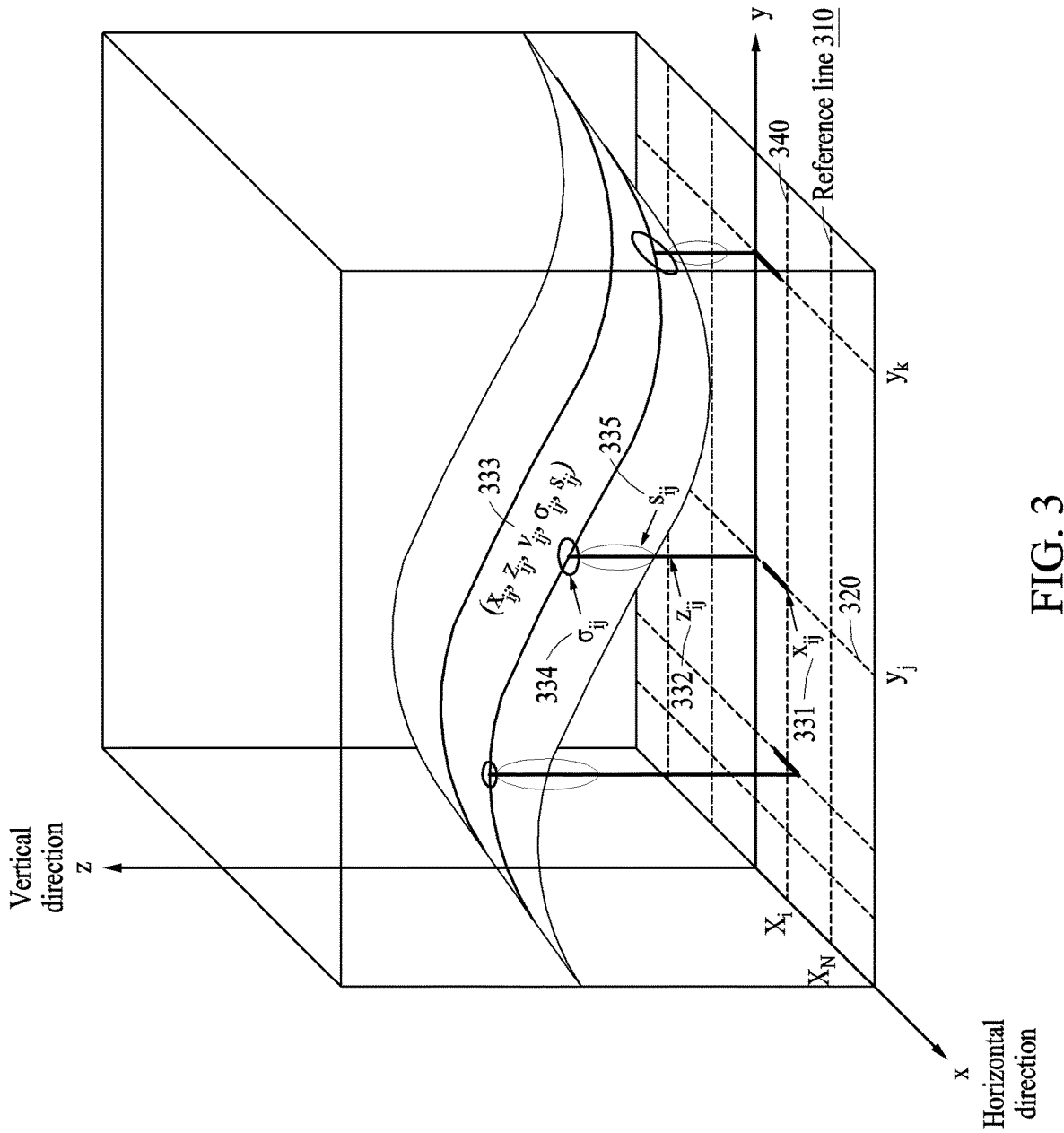
FIG. 3 illustrates an example of output data of a fourth neural network.

In an example, the processor 710 may generate 3D lane information using the offset information. The 3D lane information may include lane information in a 3D space. For example, when the 3D space is represented by a Euclidean coordinate system, a lane may be represented as a set of coordinates (x, y, z). Through this, height information of the lane may be recognized, and the processor 710 may thus recognize a more accurate road situation. The processor 710 may generate the lane information in the 3D space by applying the offset information based on a plurality of reference lines parallel to the vehicle traveling direction as illustrated in FIG. 3. For example, a reference line $X_i$ may be the same as the vehicle traveling direction. Based on the reference line $X_i$, the first offset may be xij 331. In this example, the second offset indicating a lane height from an xy plane which is a reference plane may be $z_{ij}$ 332. Thus, an actual lane may be disposed at a position that is separate from the reference line Xi by xij 331 in a horizontal direction and separate from the xy plane by $z_{ij}$ 332 in a vertical direction.

In an example, the processor 710 may generate at least one among a probability value of a reference line being a lane, visibility information (e.g., visibility information 193), a first uncertainty 194 corresponding to the first offset, and a second uncertainty 195 corresponding to the second offset, by applying the third spatial information 180 to the fourth neural network 190.

The probability value of the reference line being the lane may indicate a probability that the reference line corresponds to the lane. As illustrated in FIG. 2, there may be a plurality of reference lines in an xy plane. Each of the reference lines may have a probability of being a lane. For example, when a probability value of a reference line being a lane is 98%, the reference line may be highly likely to be the lane. For another example, when a probability value of a reference line being a lane is 5%, the reference line may be less likely to be the lane.

The visibility information 193 may include information associated with a degree of identifiability of the presence or shape of a target from a remote distance. The visibility information 193 may include a probability of a lane being viewed from a far point. The visibility information 193 may include a probability of a lane being visible from a vehicle.

In an example, the uncertainty may include an uncertainty of output data of the neural network. For example, the uncertainty may include a measure of how certain the output data of the neural network is. The uncertainty may be determined based on a variance and/or standard deviation of the offset information.

The first uncertainty 194 may include an uncertainty corresponding to the first offset. The first uncertainty 194 may include an uncertainty associated with an offset in a horizontal direction. For example, when the first uncertainty 194 increases, it may indicate an uncertain presence of a lane at a position separate by the first offset.

The second uncertainty 195 may include an uncertainty corresponding to the second offset. The second uncertainty 195 may include an uncertainty associated with an offset in a vertical direction. For example, when the second uncertainty 195 increases, it may indicate an uncertain presence of a lane at a position separate by the second offset.

In an example, a loss function may be determined based on a difference between target data to be compared and output data of the neural network. The target data to be compared may be labeled ground truth data and/or unlabeled data. The processor 710 may update parameters of the neural network to reduce the loss function.

In an example, the neural network may include a neural network trained using a loss function defined based on at least one of a first uncertainty and a second uncertainty. The neural network may include a neural network trained using a first loss function. The first loss function may be defined based on at least one of the first uncertainty and the second uncertainty. The processor 710 may update the parameters of the neural network based on the first loss function. For example, when the uncertainty is small, the processor 710 may greatly update the parameters of the neural network. For another example, when the uncertainty is great, the processor 710 may slightly update the parameters of the neural network.

The first loss function may be represented as Equation 1.

$$L_{reg} = \sum_{i=1}^{N}\sum_{j=1}^{K}\hat{p}_{ij}*\hat{v}_{ij}*\text{LapL1}(x_{ij};\hat{x}_{ij};\sigma_{ij}) + \sum_{i=1}^{N}\sum_{j=1}^{NK}\hat{p}_{ij}*\hat{v}_{ij}*\text{LapL1}(z_{ij};\hat{z}_{ij};s_{ij}) \quad \text{[Equation 1]}$$

In Equation 1, i denotes an $i_{th}$ reference line. $y_j$ denotes a $j_{th}$ line among a plurality of lines generated as a y axis is divided based on a predetermined criterion. $x_{ij}$ denotes a first offset indicating a displacement difference in a horizontal direction from an intersection between the $i_{th}$ reference line and the $j_{th}$ line. $z_{ij}$ denotes a second offset indicating a displacement difference in a vertical direction after a movement by the first offset from the intersection between the $i_{th}$ reference line and the $j_{th}$ line. $\hat{x}_{ij}$ an $\hat{z}_{ij}$ denote ground truth data. $\sigma_{ij}$ denotes a first uncertainty and $s_{ij}$ denotes a second uncertainty. LapL1 is defined as Equation 2.

$$\text{LapL1}(x, \hat{x}, \sigma) = \frac{|x - \hat{x}|_1}{\sigma} + \log\sigma \quad \text{[Equation 2]}$$

Equation 2 represents a Laplace loss function. In Equation 2, x̂ denotes ground truth data. x and σ denote an offset which is output data of the neural network and an uncertainty corresponding to the offset, respectively.

In an example, the neural network may include a neural network trained using a loss function defined based on a probability value of a reference line being a lane. The neural network may be trained using a second loss function based on the probability value of the reference line being the lane. The second loss function may be defined based on binary classification indicating whether the reference line is the lane. The second loss function may be represented by cross entropy. The second loss function may have a small value when a difference between a probability of an actual reference line being a lane and a probability of a reference line predicted through the neural network being the lane is small, and may have a great value when the difference is great. The processor 710 may update the parameters of the neural network to reduce the size of the second loss function. The second loss function may be represented as Equation 3.

$$\mathcal{L}_{cls} = -\sum_{i=1}^{N}(\hat{p}_i \log p_i + (1-\hat{p}_i)\log(1-p_i))$$ [Equation 3]

In Equation 3, $p_i$ denotes a probability value of an $i_{th}$ reference line being a lane, and may be output data of the neural network. $\hat{p}_i$ denotes a probability value of the $i_{th}$ reference line being an actual lane, and may be ground truth data.

In an example, the neural network may include a neural network trained using a loss function defined based on visibility information. The neural network may include a neural network trained using a third loss function. The third loss function may be defined based on the visibility information. The third loss function may be determined based on binary classification indicating as to whether a lane is visible or not. The third loss function may be represented by cross entropy. The third loss function may have a small value when a difference between a probability of an actual lane being visible and a probability of a lane predicted through the neural network being visible is small, and may have a great value when the difference is great. The processor 710 may update the parameters of the neural network to reduce the size of the third loss function. The third loss function may be represented as Equation 4.

$$\mathcal{L}_{vis} = -\sum_{i=1}^{N}\sum_{j=1}^{K}(\hat{v}_{ij}\log v_{ij} + (1-\hat{v}_{ij})\log(1-v_{ij}))$$ [Equation 4]

In Equation 4, j denotes a plurality of lines generated as a y axis in FIG. 3 is divided based on a predetermined criterion. $v_{ij}$ denotes visibility information corresponding to an intersection between an $i_{th}$ reference line and a $j_{th}$ line. $v_{ij}$ may include the visibility information which is output data of the neural network. $\hat{v}_{ij}$ may include visibility information which is ground truth data.

In an example, the loss function may be determined based on at least one of the first loss function, the second loss function, and the third loss function. The loss function may be represented as Equation 5.

$$\text{Loss} = \lambda_{reg}\mathcal{L}_{reg} + \lambda_{cls}\mathcal{L}_{cls} + \lambda_{vis}\mathcal{L}_{vis}$$ [Equation 5]

In Equation 5, λreg, λcls, and λvis denote coefficients respectively corresponding to a first loss function, a second loss function, and a third loss function. In an example, Lreg denotes the first loss function, Lcls denotes the second loss function, and Lvis denotes the third loss function.

In lane recognition performed through a method of generating lane information (hereinafter simply "a lane information generating method") described herein, the processor 710 may use road depth information, which may facilitate the recognition of various road shapes. In addition, a voxel map representation described herein may enable a more accurate recognition of lanes in the various road shapes.

FIG. 2 illustrates an example of spatial information.

Referring to FIG. 2, illustrated are an imaging device 210, a lane 211, depth distribution information 1 231, lane feature information 151, first spatial information 1 260, an imaging device-lane distance 250, depth distribution information 2 251, and first spatial information 2 270.

The depth feature information 152 may include at a lane height 230 which is a length in a vertical direction with respect to a reference line and a difference between an imaging device and a lane (e.g., the imaging device-lane distance 250).

The lane height 230 may represent a height of a lane determined based on a reference plane including a reference line in a 3D space. For example, when an xy plane is the reference plane as illustrated in FIG. 2, a z value of the lane may be the height of the lane. For example, the lane 211 may be indicated by coordinates (u, v), and the coordinates (u, v) may be coordinates of the xy plane. On the reference line, a plurality of points may be present. For example, when the reference line is parallel to a y axis, there may be eight points (u, v1), (u, v2), (u, v3), (u, v4), (u, v5), (u, v6), (u, v7), and (u, v8) on the reference line. In addition, there may be depth information corresponding to each of the points. For example, there may be a lane height corresponding each of the eight points. The lane height corresponding to each of the points may be indicated by a probability distribution. For example, the depth distribution information 1 231 may include a probability distribution of a lane height corresponding to the coordinates (u, v). Thus, the depth distribution information 1 231 may include a vector having, as an element, a probability value for each of the lane height at the coordinates (u, v).

In an example, a processor (e.g., a processor 710 of FIG. 7) may generate the first spatial information 260 through an outer product of the lane feature information 151 and the depth distribution information 1 231. For example, when the processor 710 calculates an outer product of the lane feature information 151 corresponding to the coordinates (u, v) and the depth distribution information 1 231, a colored portion in the first spatial information 1 260 may be generated.

The imaging device-lane distance 250 may include a Euclidean distance between an imaging device and a lane. The imaging device-lane distance 250 may be calculated using coordinates of each. For example, as illustrated, the processor 710 may calculate a distance between the imaging device 210 and the lane 211 using coordinates of the imaging device 210 and coordinates of the lane 211.

In an example, depth feature information may include the imaging device-lane distance 250. For example, the imaging device-lane distance 250 corresponding to the lane 211 may be indicated as the depth distribution information 2 251. The depth distribution information may include a probability distribution for each imaging device-lane distance. Thus, the depth distribution information 2 251 may include a vector having, as an element, a probability value of each imaging device-lane distance.

In an example, the processor 710 may generate the first spatial information 2 270 through an outer product of the lane feature information 151 and the depth distribution information 2 251. For example, when the processor 710 calculates the outer product of the lane feature information 151 and the depth distribution information 2 251 corresponding to the coordinates (u, v), a colored portion in the first spatial information 2 270 may be generated.

In an example, the depth distribution information may include information determined based on the depth distribution information 1 231 corresponding to the lane height 230 and the depth distribution information 2 251 corresponding to the imaging device-lane distance 250. Thus, in an example, first spatial information may include at least one of the first spatial information 1 260 and the first spatial information 2 270.

FIG. 3 illustrates an example of output data of a fourth neural network.

In the example of FIG. 3, illustrated are a y axis which is a vehicle traveling direction, an x axis which is a horizontal direction of the y axis, a z axis which is a vertical direction of the y axis, a reference line 310, an $i_{th}$ reference line Xi 340, a $j_{th}$ line 320 parallel to the x axis, a first offset 331, a second offset 332, visibility information 333, a first uncertainty 334, and a second uncertainty 335.

In an example, a processor (e.g., a processor 710 of FIG. 7) may generate offset information including a displacement difference between a lane position and a reference line by applying spatial information to a fourth neural network (e.g., the fourth neural network 190 of FIG. 1). For example, the processor 710 may generate the offset information by applying third spatial information (e.g., the third spatial information 180 of FIG. 1) to the fourth neural network 190.

In an example, the fourth neural network 190 may include a neural network trained to generate information needed for generating 3D lane information. The fourth neural network 190 may include a neural network trained to generate at least one among offset information (e.g., 331 and 332), a probability value of a reference line being a lane, the visibility information 333, and an uncertainty (e.g., 334 and 335).

The offset information may include information as to how far a lane is from a reference line. The offset information may include a displacement difference between a position of the lane and the reference line. The offset information may include at least one of a first offset in a direction (e.g., an x-axis direction in FIG. 3) horizontal to the reference line which is a vehicle traveling direction (e.g., a y-axis direction in FIG. 3), and a second offset in a direction (e.g., a z-axis direction in FIG. 3) vertical to the reference line. In a 3D space, the reference line may be the vehicle traveling direction. In the 3D space, when a y axis (or a longitudinal axis) corresponds to the vehicle traveling direction, the reference line may be parallel to the y axis. When the reference line is parallel to the y axis in the 3D space, a direction horizontal to the vehicle traveling direction may correspond to an x axis (or a lateral axis). In this case, a direction vertical to the vehicle traveling direction may correspond to a z axis (or a vertical axis). Thus, the first offset may include a displacement difference in the x-axis (or the lateral axis) direction. In the example of FIG. 3, the first offset may be indicated as $x_{ij}$ 331, and the second offset may be indicated as $z_{ij}$ 332.

In an example, the processor 710 may generate 3D lane information using the offset information. The 3D lane information may include lane information in a 3D space. For example, when the 3D space is represented by a Euclidean coordinate system, a lane may be represented as a set of coordinates (x, y, z). In this example, height information of the lane may be recognized, and the processor 710 may thus recognize a more accurate road situation. The processor 710 may generate the lane information in the 3D space by applying the offset information based on reference lines X1, X2, X3, ..., Xn parallel to the vehicle traveling direction, or the y axis, as illustrated in FIG. 3. For example, $X_i$ may indicate an $i_{th}$ reference line. In addition, $y_j$ may indicate a $j_{th}$ line among a plurality of lines generated as the y axis is divided based on a predetermined criterion. The y axis may be divided based on the predetermined criterion. For example, the y axis may be divided into ten lines. Thus, $x_{ij}$ 331 may be a first offset indicating a displacement difference in a horizontal direction from an intersection between the $i_{th}$ reference line and the $j_{th}$ line. The first offset with reference to the reference line $X_i$ may be $x_{ij}$ 331. The second offset indicating a lane height from an xy plane which is a reference plane may be $z_{ij}$ 332. Thus, an actual lane may be disposed at a position that is separate from the reference line Xi by $x_{ij}$ 331 in the horizontal direction and by zij 332 in the vertical direction.

The visibility information 333 may include information associated with a degree of identifiability of the presence or shape of a target object from a remote distance. The visibility information 333 may include a probability of a lane being viewed from a far point. In the example of FIG. 3, the visibility information 333 may be indicated as $v_{ij}$.

The first uncertainty 334 may include an uncertainty corresponding to the first offset. In the example of FIG. 3, the first uncertainty 334 may be indicated as $\sigma_{ij}$. $\sigma_{ij}$ may represent an uncertainty of the first offset corresponding to the intersection between the $i_{th}$ reference line and the $j_{th}$ line. The first uncertainty 334 may include an uncertainty associated with an offset in the horizontal direction. For example, when the first uncertainty 334 increases, it may indicate an uncertain presence of a lane at a position separate by the first offset.

The second uncertainty 335 may include an uncertainty corresponding to the second offset. The second uncertainty 335 may be indicated as $s_{ij}$. $s_{ij}$ may represent an uncertainty of the second offset corresponding to the intersection between the $i_{th}$ reference line and the $j_{th}$ line. The second uncertainty 335 may include an uncertainty associated with an offset in the vertical direction. For example, when the second uncertainty 335 increases, it may indicate an uncertain presence of a lane at a position separate by the second offset.

Figure 4:
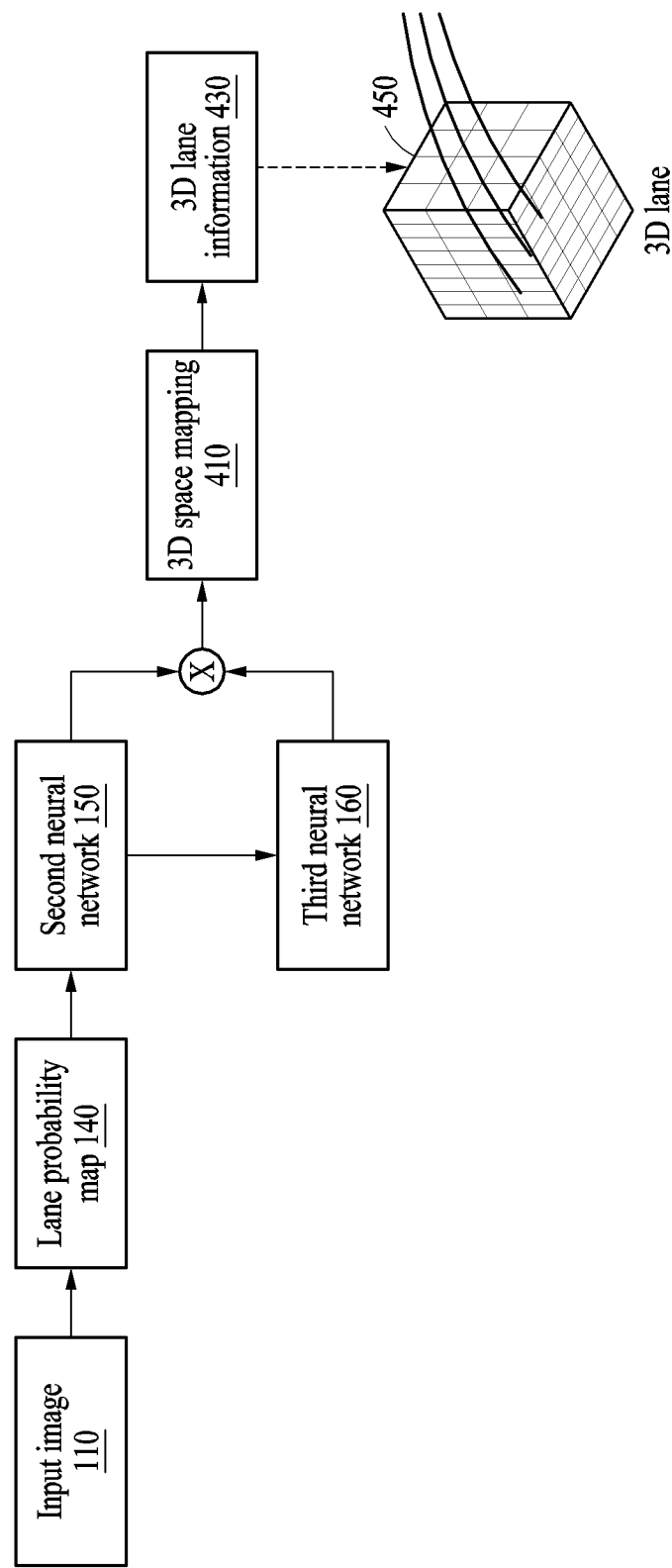
FIG. 4 illustrates an example of generating lane information.

FIG. 4 illustrates an example of generating lane information.

In the example of FIG. 4, illustrated are an input image 110, a lane probability map 140, a second neural network 150, a third neural network 160, a 3D spatial mapping 410, 3D lane information 430, and a 3D lane 450.

In an example, a processor (e.g., a processor 710 of FIG. 7) may generate the lane probability map 140 by applying the input image 110 to a first neural network.

The processor 710 may generate lane feature information and depth feature information by applying the lane probability map 140 to the second neural network 150.

The processor 710 may obtain depth distribution information by applying the depth feature information to the third neural network 160.

The processor 710 may generate spatial information based on the lane feature information and the depth distribution information.

The processor 710 may perform the 3D spatial mapping 410 to map the generated spatial information into another 3D space. The processor 710 may perform the 3D spatial mapping 410 to map the generated spatial information into the 3D space viewed by different viewpoints.

The processor 710 may perform the following operations to perform the 3D spatial mapping 410 to map the generated spatial information into the 3D space.

The processor 710 may generate frustum-based first spatial information based on the lane feature information and the depth distribution information. The processor 710 may transform the first spatial information into voxel map-based second spatial information. The processor 710 may transform the second spatial information into third spatial information based on channel dimension information.

The processor 710 may generate the 3D lane information 430 using the third spatial information.

The processor 710 may output the third lane 450 to a display based on the 3D lane information 430.

Figure 5:
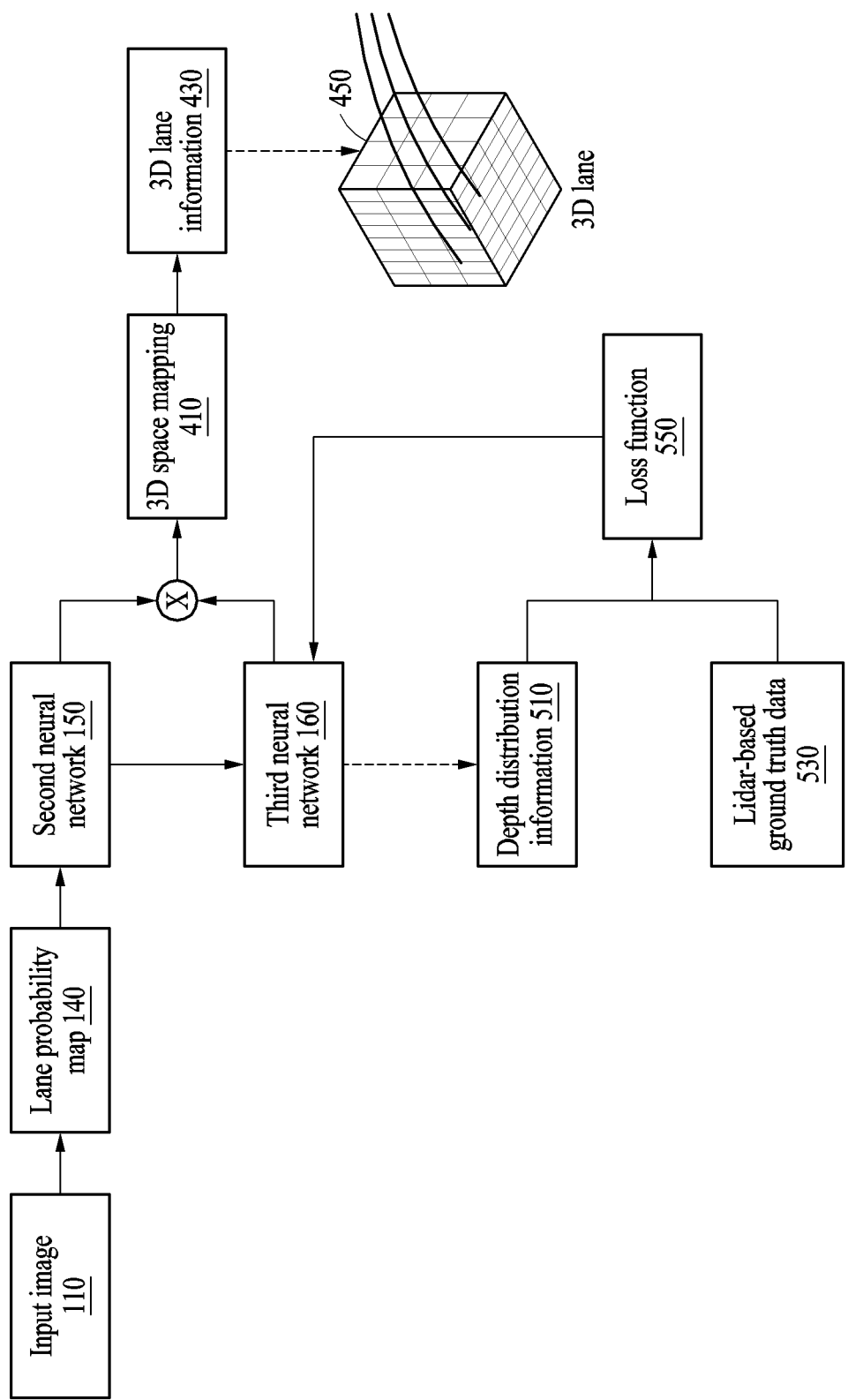
FIG. 5 illustrates an example of training a neural network.

FIG. 5 illustrates an example of training a neural network.

In the example of FIG. 5, illustrated are an input image 110, a lane probability map 140, a second neural network 150, a third neural network 160, a 3D spatial mapping 410, 3D lane information 430, depth distribution information 510, and light detection and ranging (lidar)-based ground truth data 530.

In an example, a neural network may be trained through supervised and/or unsupervised learning. The unsupervised learning may include training the neural network using unlabeled data as ground truth data. For example, the neural network may be trained using an image including lanes as training data. The supervised learning may include training the neural network using labeled data as ground truth data. The labeled data may include, for example, data including labeled lanes in an image.

In an example, a processor (e.g., a processor 710 of FIG. 7) may train the neural network through the supervised learning. The processor 710 may train the neural network using training data that uses labeled data as ground truth data. The labeled data may be obtained through a simulation. For example, the processor 710 may use, as the training data, labeled lane data, in a simulation of a vehicle traveling on a road.

Hereinafter, training the neural network using the lidar-based ground truth data 530 will be described with reference to FIG. 5. In an example, labeled data may include the lidar-based ground truth data 530. The lidar-based ground truth data 530 may include data generated based on data obtained through a lidar sensor. The processor 710 may obtain depth information through the lidar sensor. The processor 710 may obtain a depth probability distribution corresponding to each pixel based on the depth information obtained through the lidar sensor. The processor 710 may use, as ground truth data, the depth information (or a probability distribution based on the depth information) obtained through the lidar sensor. Thus, for example, the processor 710 may update parameters of the neural network to reduce a difference between the depth distribution information 510, which is output data of the third neural network 160, and the lidar-based ground truth data 530 through a comparison therebetween. For another example, the processor 710 may update the parameters of the neural network to reduce a difference between depth feature data, which is an output of the second neural network 150, and the lidar-based ground truth data 530 through a comparison therebetween.

Figure 6:
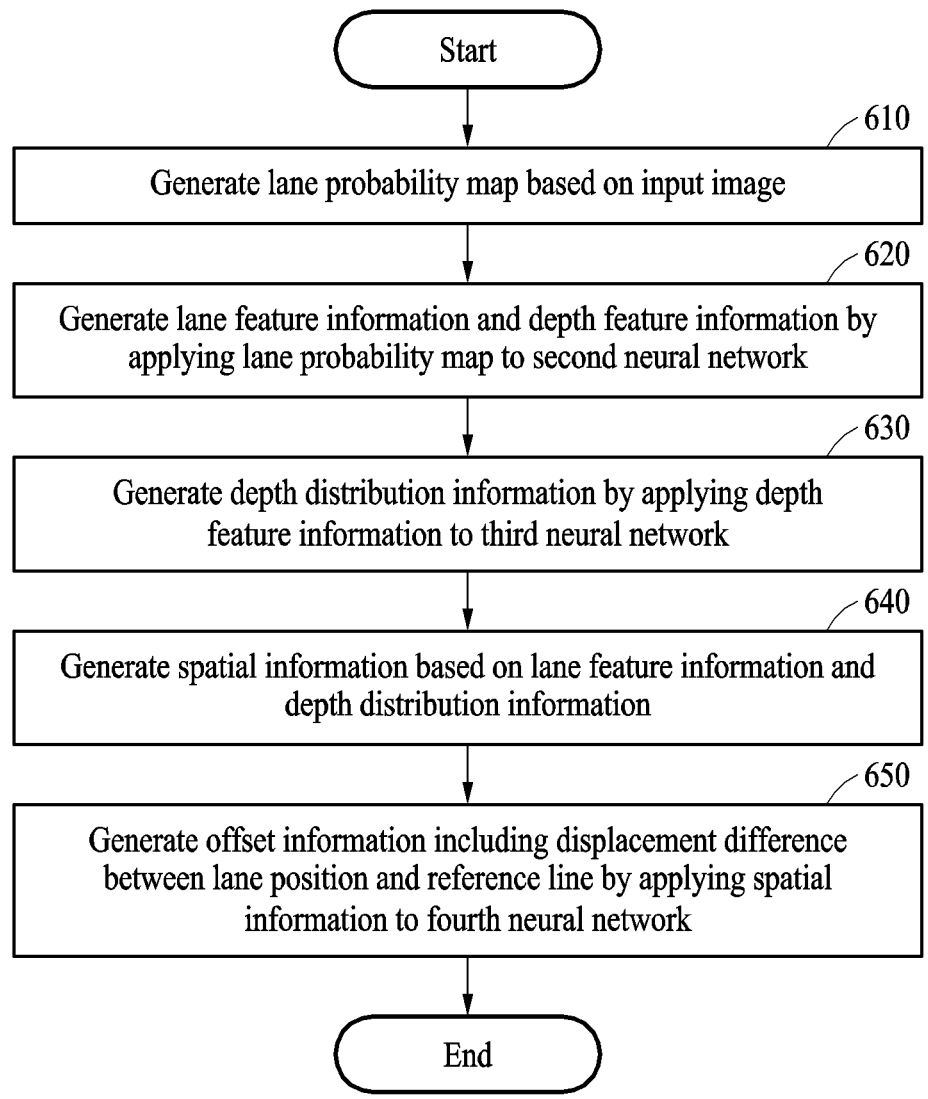
FIG. 6 illustrates an example of a method of generating lane information.

FIG. 6 illustrates an example of a lane information generating method. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. One or more blocks of FIG. 6, and combinations of the blocks, can be implemented by special purpose hardware-based computer, such as a processor, that perform the specified functions, or combinations of special purpose hardware and computer instructions. For example, operations of the method may be performed by a computing apparatus (e.g., the electronic device 700 in FIG. 7). In addition to the description of FIG. 6 below, the descriptions of FIGS. 1-5 are also applicable to FIG. 6, and are incorporated herein by reference. Thus, the above description may not be repeated here.

In an example, in operation 610, an electronic device (e.g., an electronic device 700 of FIG. 7) may generate a lane probability map based on an input image.

The electronic device 700 may generate the lane probability map using a first neural network trained to generate lane probability values respectively corresponding to a plurality of pixels included in the input image.

In operation 620, the electronic device 700 may generate lane feature information and depth feature information by applying the lane probability map to a second neural network.

In operation 630, the electronic device 700 may generate depth distribution information by applying the depth feature information to a third neural network.

In operation 640, the electronic device 700 may generate spatial information based on lane feature information and the depth distribution information.

The electronic device 700 may generate frustum-based first spatial information through an outer product of the lane feature information and the depth distribution information.

The electronic device 700 may generate the frustum-based first spatial information based on the lane feature information and the depth distribution information.

The electronic device 700 may transform the first spatial information into voxel map-based second spatial information.

The electronic device 700 may transform the second spatial information into third spatial information based on channel dimension information.

The electronic device 700 may determine the third spatial information to be the spatial information.

In operation 650, the electronic device 700 may generate offset information including a displacement difference between a lane position and a reference line by applying the spatial information to a fourth neural network.

The electronic device 700 may generate 3D lane information using the offset information.

The electronic device 700 may generate at least one among a probability value of a reference line being a lane, visibility information, a first uncertainty corresponding to a first offset, and a second uncertainty corresponding to a second offset by applying the spatial information to the fourth neural network.

FIG. 7 illustrates an example of an electronic device.

Referring to FIG. 7, an electronic device 700 may include a memory 720, a processor 710, and a communication interface 730. The memory 720, the processor 710, and the communication interface 730 may be connected to one another through a communication bus 740.

The memory 720 may store various sets of information generated during processing performed by the processor 710, and various neural network parameters. The memory 720 may also store various sets of data and programs. The memory 720 may include a volatile memory or a nonvolatile memory. The volatile memory device may be implemented as a dynamic random-access memory (DRAM), a static random-access memory (SRAM), a thyristor RAM (T-RAM), a zero capacitor RAM (Z-RAM), or a twin transistor RAM (TTRAM).

The non-volatile memory device may be implemented as an electrically erasable programmable read-only memory (EEPROM), a flash memory, a magnetic RAM (MRAM), a spin-transfer torque (STT)-MRAM, a conductive bridging RAM (CBRAM), a ferroelectric RAM (FeRAM), a phase change RAM (PRAM), a resistive RAM (RRAM), a nanotube RRAM, a polymer RAM (PoRAM), a nano floating gate Memory (NFGM), a holographic memory, a molecular electronic memory device), or an insulator resistance change memory. Further details regarding the memory 720 is provided below.

The processor 710 may be a processing device implemented by hardware including a circuit having a physical structure to perform operations. For example, the operations may be implemented by execution of computer-readable instructions that configure the processing device to perform any one, or any combination, of the operations described.

For example, the hardware-implemented data processing device may include a microprocessor, a central processing unit (CPU), a processor core, a multi-core processor, a multiprocessor, an application-specific integrated circuit (ASIC), and a field-programmable gate array (FPGA). Further details regarding the processor 710 is provided below.

The processor 710 may execute a program and control the electronic device 700. A code of the program executed by the processor 710 may be stored in the memory 720. The processor 710 may execute the code to perform the methods illustrated in FIGS. 1-6.

A neural network may output a value calculated based on internal parameteters in response to input data. At least a portion of the neural network may be implemented on hardware including a neural processor, or computer instructions running on such hardware. The neural network may be a deep neural network (DNN) including a fully connected network, a deep convolutional network, a recurrent neural network, and the like. The DNN may include a plurality of layers. The layers may include an input layer, one or more hidden layers, and an output layer. The neural network may be trained to perform given operations by mapping input data and outptut data that are in a nonlinear relationship to each other based on deep learning. Deep learning may be a machine learning method for solving a given problem from a big dataset. Deep learning may be a process of optimizing the neural network to find a point for minimizing energy while training the neural network using provided training data.

The processor 710 may read/write neural network data, for example, image data, feature map data, kernel data, biases, weights, for example, connection weight data, hyperparameters, and other parameters etc., from/to the memory 720 and implement a neural network using the read/written data. When the neural network is implemented, the processor 710 may repeatedly perform operations between an input and parameters to generate data with respect to an output. Here, in an example convolution layer, a number of convolution operations may be determined, depending on various factors, such as, for example, the number of channels of the input or input feature map, the number of channels of the kernel, a size of the input feature map, a size of the kernel, number of the kernels, and precision of values. Such a neural network may be implemented as a complicated architecture, where the processor 710 performs convolution operations with an operation count of up to hundreds of millions to tens of billions, and the frequency at which the processor 710 accesses the memory 720 for the convolution operations rapidly increases.

Figure 8:
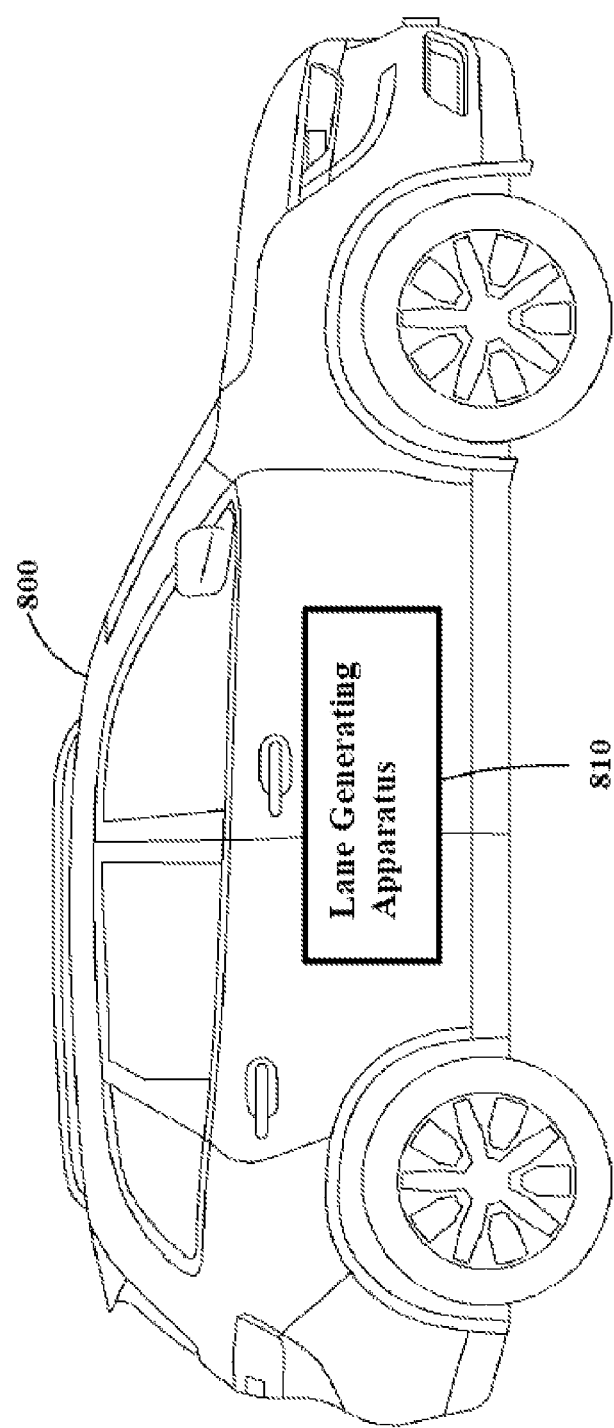
FIG. 8 illustrates an example of a vehicle.

FIG. 8 illustrates an example of a vehicle 800. Referring to FIG. 8, a vehicle 800 may include a neural network-based lane generating apparatus 810. The neural network-based lane generating apparatus 810 may include a memory, a processor, and a communication interface (not shown). As a non-limiting example, these memory, processor, and communication interface of the neural network-based lane generating apparatus 810 may correspond to the memory 720, processor 710, and communication interface 730 of FIG. 7. Thus, the above description may not be repeated here. The vehicle 800 may be, for example, an electric vehicle, a smart vehicle, or an autonomous vehicle.

According to an example, neural network-based lane generating apparatus 810 may generate 3D lane information as described above with reference to FIGS. 1-7. The 3D lane generation information may be output through a display of the vehicle 800, or be sent to an electronic control unit (ECU) or a vehicle control unit (VCU) of the vehicle 800. In an example, the ECU or VCU of the vehicle 800 may apply the 3D lane generation information for automated driving, semi-automated driving, or lane guidance/maintenance of the vehicle 800. In an example, the ECU or VCU of the vehicle 800 may output 3D lane generation information through a display of the vehicle 800.

The description provided with reference to FIGS. 1 through 7 may be applicable to the description provided with reference to FIG. 8, and thus further description is not repeated herein.

The electronic device 700, and other devices, apparatuses, units, modules, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The methods illustrated in FIGS. 1-7 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions, or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the method of generating lane information using a neural network. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque (STT)-MRAM, static random-access memory (SRAM), thyristor RAM (T-RAM), zero capacitor RAM (Z-RAM), twin transistor RAM (TTRAM), conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A processor-implemented method of generating lane information using a neural network, comprising:
generating a lane probability map based on an input image;
generating lane feature information and depth feature information by applying the lane probability map to a second neural network;
generating depth distribution information by applying the depth feature information to a third neural network;
generating spatial information based on the lane feature information and the depth distribution information;
generating offset information comprising a displacement between a position of a lane and a reference line by applying the spatial information to a fourth neural network; and
generating three-dimensional (3D) lane information using the offset information.

2. The method of claim 1, wherein the generating of the lane probability map comprises:
generating the lane probability map using a first neural network trained to generate lane probability values respectively corresponding to pixels in the input image, wherein each of the lane probability values comprise a probability of a pixel of the pixels being in the lane.

3. The method of claim 1, wherein the second neural network is trained to generate the lane feature information using a first channel associated with lane features, or to generate the depth feature information using a second channel associated with depth features.

4. The method of claim 1, wherein the depth feature information comprises at least one of a height of the lane comprising a length in a vertical direction with respect to the reference line or a distance between an imaging device and the lane.

5. The method of claim 1, wherein the depth distribution information comprises depth probability distributions respectively corresponding to pixels in the input image.

6. The method of claim 1, wherein the generating of the spatial information comprises:
generating frustum-based first spatial information through an outer product of the lane feature information and the depth distribution information.

7. The method of claim 1, wherein the generating of the spatial information comprises:
generating frustum-based first spatial information based on the lane feature information and the depth distribution information;
transforming the first spatial information into voxel map-based second spatial information;
transforming the second spatial information into third spatial information based on channel dimension information; and
determining the third spatial information to be the spatial information.

8. The method of claim 7, wherein the first spatial information comprises spatial information in a 3D coordinate system based on a viewpoint of the input image.

9. The method of claim 7, wherein the second spatial information comprises spatial information in a 3D coordinate system based on a viewpoint of a vehicle.

10. The method of claim 7, wherein the transforming into the second spatial information comprises:
transforming the first spatial information into the second spatial information based on calibration parameters, wherein the calibration parameters comprise any one or any combination of intrinsic parameters of an imaging device for capturing the input image and extrinsic parameters of the imaging device.

11. The method of claim 10, wherein the intrinsic parameters comprise one or any combination of focal length, a principal point, an aspect ratio, a center point, and an asymmetry parameter of the imaging device and the extrinsic parameters comprise an installation height of the imaging device, a pan of the imaging device, and a tilt of the imaging device.

12. The method of claim 1, wherein the offset information comprises at least one of a first offset in a direction horizontal to a travel direction of a vehicle or a second offset in a direction vertical to the reference line.

13. The method of claim 1, further comprising:
generating at least one of a probability value of the reference line being the lane, visibility information, a first uncertainty corresponding to a first offset, and a second uncertainty corresponding to a second offset, by applying the spatial information to the fourth neural network.

14. The method of claim 1, wherein the neural network is trained using a loss function defined based on any one or any combination of a first uncertainty and a second uncertainty.

15. The method of claim 1, wherein the neural network is trained using a loss function defined based on any one or any combination of a first uncertainty associated with an offset in a horizontal direction and a second uncertainty associated with an offset in a vertical direction.

16. The method of claim 1, wherein the neural network comprises a neural network trained using a loss function defined based on a probability value of the reference line being the lane.

17. The method of claim 1, wherein the neural network comprises a neural network trained using a loss function defined based on visibility information.

18. The method of claim 1, wherein the first neural network comprises a neural network trained using images labelled with lanes as ground truth data.

19. A non-transitory computer-readable storage medium storing instructions that, when executed by a processor, cause the processor to perform the method of claim 1.

20. A device comprising:
a processor configured to
generate a lane probability map based on an input image,
generate lane feature information and depth feature information by applying the lane probability map to a second neural network,
generate depth distribution information by applying the depth feature information to a third neural network,
generate spatial information based on the lane feature information and the depth distribution information,
generate offset information comprising a displacement between a position of a lane and a reference line by applying the spatial information to a fourth neural network, and
generate three-dimensional (3D) lane information using the offset information.

21. A vehicle comprising:
a sensor configured to capture an input image;
a processor configured to execute instructions stored in a non-transitory computer-readable storage medium to
generate a lane probability map based on the first neural network trained to generate lane probability values respectively corresponding to pixels in the input image, generate lane feature information and depth feature information by applying the lane probability map to the second neural network, generate depth distribution information by applying the depth feature information to the third neural network, generate spatial information based on the lane feature information and the depth distribution information, and generate offset information comprising a displacement between a position of a lane and a reference line by applying the spatial information to the fourth neural network, generate three-dimensional (3D) lane information using the offset information, and output the 3D lane information to a vehicle control unit (VCU) of the vehicle.

22. The method of claim 21, wherein the second neural network comprises a first sub-neural network trained to generate the lane feature information, and a second sub-neural network trained to generate the depth features, and the first sub-neural network and the second sub-neural network share one or more layers.

* * * * *